Figure 1:
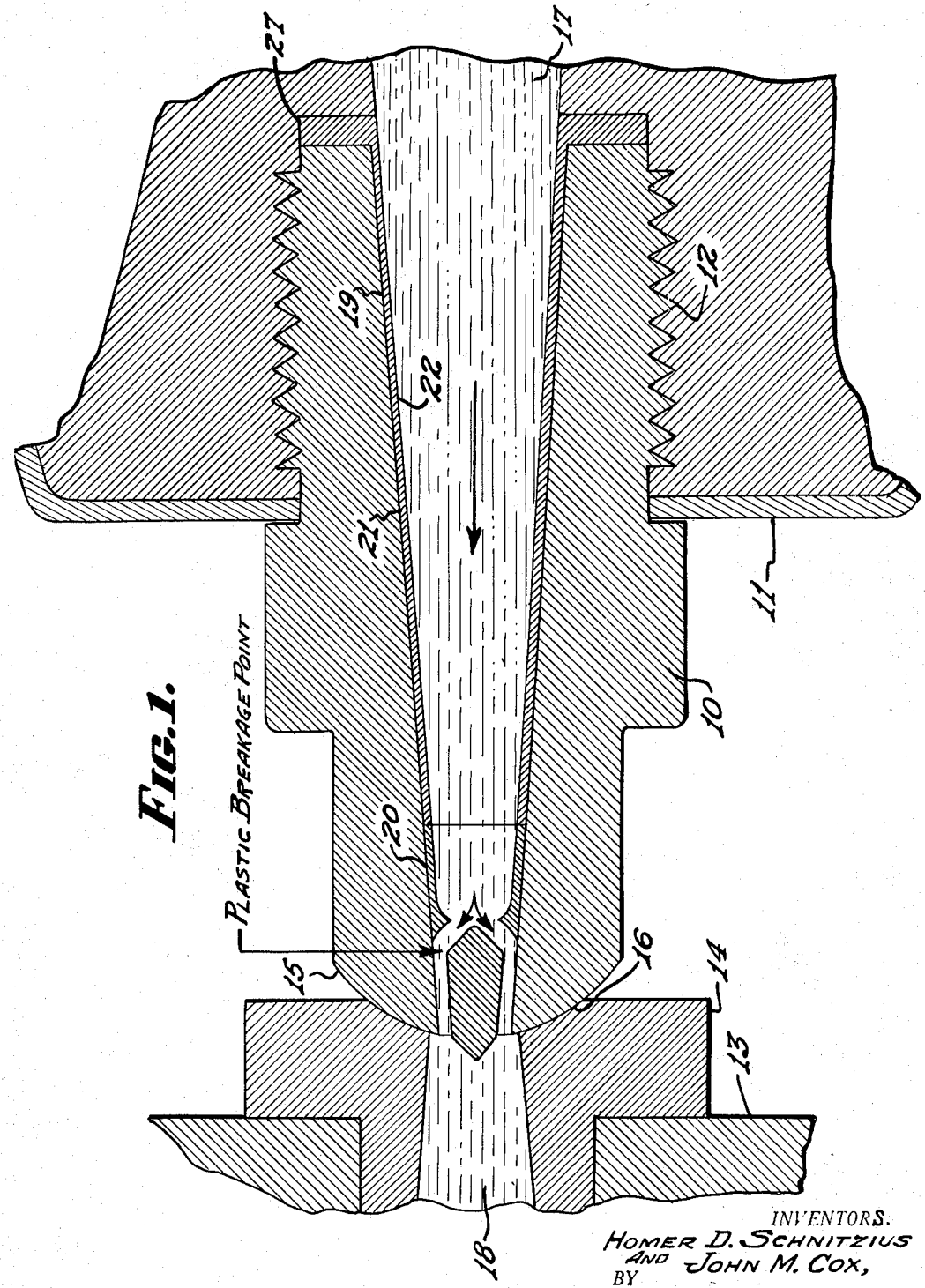

May 29, 1956 H. D. SCHNITZIUS ET AL 2,747,226
ANTISTRINGING INJECTION NOZZLE
Filed July 25, 1952 2 Sheets-Sheet 2

INVENTOR.
HOMER D. SCHNITZIUS
BY AND JOHN M. COX,
Allen & Allen
ATTORNEYS.

United States Patent Office 2,747,226
Patented May 29, 1956

2,747,226

ANTISTRINGING INJECTION NOZZLE

Homer D. Schnitzius and John M. Cox, Indianapolis, Ind., assignors to The Richardson Company, Cincinnati, Ohio, a corporation of Ohio Application July 25, 1952, Serial No. 300,912

4 Claims. (Cl. 18—30)

Our invention relates to the provision of an anti-stringing injection nozzle particularly adapted for use on polystyrene material which is injected hot into molds and the like.

It has recently become the practice to form many objects of polystyrene material by the injection molding thereof. In order to accomplish this an injection nozzle is brought into contact with the rear of a mold and the sprue opening which leads therefrom to the mold cavities. Hot polystyrene material is then forced through the nozzle into the sprue opening and into the mold cavities. An important problem occasioned by this process is that of obtaining a satisfactory break between the sprue and the injection nozzle when the nozzle is backed away from the mold following completion of the particular molding process.

It is now common that when the injection nozzle is backed away from the mold the soft core of the sprue does not snap off but rather it necks down and stretches to form a very fine filament-like strand which often lies across the die faces and causes marring thereof when the dies are closed again. Such marring leads to undue flash and a high rate of rejection. In addition the dies themselves are greatly worn with attendant increased production cost. It will be plainly evident that this "stringing" is a very serious problem.

Although we have mentioned our anti-stringing injection nozzle as being particularly adapted for use on polystyrene material it is to be understood that the nozzle has general application in all fields wherein a heated material is forced into a die and wherein the material does not normally cool to such an extent that a clean break will be obtained between the sprue opening and the nozzle when the latter is backed away from the mold faces.

Accordingly it is an object of our invention to provide a nozzle by means of which a good volume of material may be injected into a mold and yet which will provide a clean break between the sprue and the nozzle when the latter is backed away from the sprue opening of the mold.

It is an object of our invention to provide such an injection nozzle that the sprue will break clean without necking down and without forming the filament-like strands which have heretofore characterized injection molding operations of this type.

Figure 2:
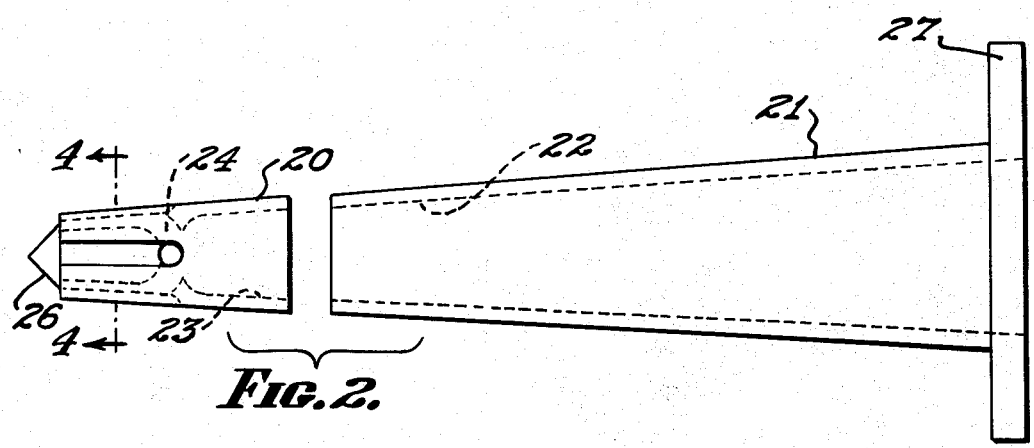
Figures 3, 4:
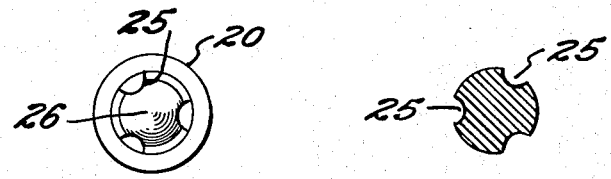

Other important objects and advantages of our invention will become apparent during the course of the following description and from reference to the accompanying drawings in which like numerals are employed to designate like parts throughout the same and in which:

Figure 1 is a section view of a standard injection nozzle and the anti-stringing device of our invention, the relation of such nozzle and device to the heater body and die plate also being shown, Figure 2 is an elevational view of the anti-stringing injection device and its associated retaining means, Figure 3 is an end view of the device of Figure 2, and Figure 4 is a section taken on the line 4—4 of Figure 2.

Briefly, in the practice of our invention we discovered that if instead of a single large opening in the injection nozzle we utilized a plurality of smaller channels we could still obtain the necessary injection volume while at the same time providing an arrangement wherein the sprue would break cleanly from the injection nozzle. Further, we found that by selecting the proper number of channels and defining a proper cross section with respect to the lengths thereof, we could obtain a device wherein the break-off between the material being injected from the nozzle and that received by the mold would actually occur within the nozzle at or very near the point where we divert a single large stream into a plurality of smaller ones as above indicated.

We found that by employing a standard injection nozzle of somewhat larger dimensions than would normally be used and then inserting therein an anti-stringing device as developed by us, along with means for retaining the anti-stringing device in place, we could realize the aims of this invention.

Referring now to Figure 1 we have generally indicated at 10 a standard injection nozzle which is normally screwed into the torpedo heater body 11 in the manner indicated at 12. The rear of the die plate is indicated at 13 and the sprue bushing at 14. It will be observed that the end of the injection nozzle is rounded as at 15 and is designed to fit against a similar surface 16 provided on the sprue bushing 14. The hot material within the injection nozzle is generally indicated at 17 and the sprue formed by the injection thereof into the mold through the sprue bushing is similarly indicated at 18. The injection nozzle itself is formed with a tapering bore 19.

Our invention resides in the provision of an anti-stringing device 20 which is designed to fit within the bore 19 of the injection nozzle 10. In order to hold this device in place we have provided a tapered retaining sleeve 21 having a tapered bore 22.

Referring now to Figures 2, 3 and 4 we shall describe the anti-stringing nozzle insert in greater detail. It will be observed that the rear and wider portion of the insert is provided with a tapered bore 23 which corresponds to an extension of that provided in the retaining sleeve 21. From the end of this bore 23 we have provided a plurality of orifices leading to the exterior wall of the device 20. These orifices 24 connect the interior bore 23 with grooves 25 formed in the exterior surface of the member 20. The end of the member 20 is tapered as at 26. We have found it desirable to have this nose 26 extend beyond the terminal point of the various grooves 25.

The insert 20 and associated retaining sleeve 21 are so designed that the total volume of material passing through the grooves 25 closely approximates the total volume of material that would ordinarily be discharged from a standard injection nozzle similar to that indicated at 10 but not incorporating the anti-stringing insert and insert retaining sleeve, assuming the same sized molds to be used in each case. As stated, this involves employing a nozzle 10 greater than would ordinarily be used for a given size mold and then incorporating therein the anti-stringing insert and its retaining sleeve as developed by us. This sleeve has a collar 27 which maintains it in proper position within the nozzle 10.

We have found that very good results are obtained with an anti-stringing insert such as developed by us if the holes 24 define an angle of about 45° with the center line of the insert. Similarly we have found that the faces of the nose 26 should also roughly correspond to a 45° angle.

We have obtained particularly good results when only three grooves 25 are provided in the anti-stringing insert. Although this is the arrangement preferred by us we do not wish to be limited to this number or to the various angles above discussed except insofar as such limitations are specifically set forth in the claims which follow. It is possible that the number of grooves utilized will change depending on the size of the injection nozzle and the volume of material which will need to be injected thereby. As above indicated the cross-sectional size of the individual channels should be so arranged that the total volume of material passing therethrough roughly corresponds to that which would ordinarily obtain for the same die to be filled by a standard nozzle not employing the anti-stringing insert. The length of the various grooves 25 should be sufficient to permit a certain amount of cooling when the mold has been filled and the nozzle is to be backed away from the sprue bushing 14. That is to say the point at which the holes 24 meet the grooves 25 should be substantially removed from the farthermost end 15 of the nozzle 10; this is fully illustrated in the figures, see especially Figures 1 and 2. The holes 24 should not meet substantially flush with the end 15 but should be set back therefrom as just described and that is the reason for having the grooves 25.

It is a distinct feature of the arrangement just described that instead of ending up with a single stream of material having a soft core which does not readily break cleanly but rather necks down and stretches to form a very fine filament-like strand, we end up by means of this invention with a plurality of streams which freeze quickly and thoroughly to the extent that each will break cleanly without necking down and stretching to form the objectionable strings above referred to. It is a further feature of this invention that by arranging the holes and grooves in the manner just described we have been able to produce a device wherein the individual streams of frozen plastic material will break at approximately the junction of the holes with the grooves, this occurring within the end of the nozzle 10.

It is to be understood that modifications may be made and changes effected in this invention without departing from the scope and spirit thereof and that although we have shown this invention as embodying certain features and including certain structures we do not wish to be limited thereby except insofar as such features and structures are specifically set forth in the sub-joined claims.

Having thus described our invention what we claim as new and what we desire to protect by United States Letters Patent is:

1. A device for use in an injection nozzle having a tapered bore therein which comprises an insert member configured to correspond to said tapered bore, said insert member having a bore within its larger end and a plurality of grooves in its exterior face adjacent its smaller end, said grooves and bore being connected by a plurality of holes, and the extreme smaller end of said insert member extending beyond the end of said injection nozzle, the face of said nozzle determined by said tapered bore cooperating with said grooves to form a plurality of passageways designed to discharge material from said nozzle in a plurality of streams about said extreme smaller end of said insert member.

2. The device of claim 1 including a retaining sleeve adapted to fit within said tapered bore and abut said insert member, said sleeve also having a tapered bore blending with the bore in said insert member.

3. A nozzle member having a large end and a smaller tapered end, said large end being bored and said smaller end having grooves exteriorly thereof, said grooves terminating in holes communicating with said bore, whereby material forced into said nozzle member at the large end in a single large stream will exit therefrom in a plurality of smaller streams defined by said holes and grooves, said holes being set at an angle of about 45° with the center line of the device and the smaller end being tapered to a point at an angle of about 45°, said grooves terminating at the base of the cone defined by said 45° taper, whereby said tapered end extends beyond said grooves.

4. The device of claim 3 in which there are three of said grooves and three of said holes.

References Cited in the file of this patent

UNITED STATES PATENTS

| | | |
|---|---|---|
| 1,970,171 | Hottel | Aug. 14, 1934 |
| 2,318,031 | Tucker | May 4, 1943 |
| 2,345,917 | Coffman | Apr. 4, 1944 |
| 2,418,856 | Stacy | Apr. 15, 1947 |
| 2,431,349 | Stacy | Nov. 25, 1947 |
| 2,456,423 | Jobst | Dec. 14, 1948 |
| 2,696,641 | Schwartz | Dec. 14, 1954 |